United States Patent
Weir et al.

(10) Patent No.: US 8,341,754 B2
(45) Date of Patent: Dec. 25, 2012

(54) PREVENTING ON-LINE VIOLATIONS OF LEGAL REGULATIONS ON USERS OF A COMMUNICATION SYSTEM

(75) Inventors: Robert C. Weir, Westford, MA (US); Diane Weir, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1443 days.

(21) Appl. No.: 11/554,134

(22) Filed: Oct. 30, 2006

(65) Prior Publication Data

US 2008/0148338 A1    Jun. 19, 2008

(51) Int. Cl.
    *H04L 29/06*      (2006.01)
(52) U.S. Cl. ............................................ 726/27; 726/28
(58) Field of Classification Search ............... 726/27–30
See application file for complete search history.

(56) References Cited

U.S. PATENT DOCUMENTS

| 6,701,345 | B1 | 3/2004 | Carley et al. |
| 6,873,987 | B1 | 3/2005 | Novaes et al. |
| 6,986,461 | B1 | 1/2006 | Geoghegan et al. |
| 7,028,034 | B2 | 4/2006 | Wesinger, Jr. et al. |
| 7,502,825 | B2* | 3/2009 | Webb et al. .................... 709/205 |
| 2006/0223599 | A1* | 10/2006 | Alfaro et al. ....................... 463/1 |
| 2007/0260603 | A1* | 11/2007 | Tuscano et al. .................... 707/9 |

OTHER PUBLICATIONS

Weiss et al., Self-Assessment, IEEE/ACM Digital Library, Nov. 1990, pp. 110-132, vol. 33, No. 11.
Kenwright, Automatic Detection of Open and Closed Separation and Attachement Lines, IEEE/ACM Digital Library, 1998, pp. 151-158.
Feller, Meeting Challenges and Surviving Success: The $2^{nd}$ Workshop on Open Source Software Engineering, 2002, pp. 669-670.

* cited by examiner

*Primary Examiner* — Edward Zee
*Assistant Examiner* — Chi Nguy
(74) *Attorney, Agent, or Firm* — David A. Dagg

(57) ABSTRACT

A system for preventing on-line violations of open meeting regulations and similar laws, in which one or more special classes of users are defined for an electronic communication system. Special class definitions include the number of group members that make a quorum for each special class. If a user is a special class member, a determination is made as to whether posting or sending a message being composed would violate any legal restrictions associated with that special class such as a serial quorum based on a total number of special class members that would be participants in the communication to which the message would be added, if the message were in fact conveyed. If the number of special class members that would be participants in the communication if the message were conveyed reaches the special class quorum, the message is rejected, and prevented from entry into the communication system.

19 Claims, 7 Drawing Sheets

PREVENTING ON-LINE VIOLATIONS OF LEGAL REGULATIONS ON USERS OF A COMMUNICATION SYSTEM

FIELD OF THE INVENTION

The disclosed system relates generally to automated systems for controlling information shared between computer system users, and more specifically to a method and system for preventing on-line violations of open meeting regulations and similar laws.

BACKGROUND OF THE INVENTION

In various contexts or situations, requirements exist to the effect that a specific group of people cannot discuss certain topics or subject matter in private. Often these requirements arise out of regulations that are designed to protect the public's right to be informed about certain matters. For example, the Commonwealth of Massachusetts has enacted the Open Meeting Law ("OML") (Massachusetts General Laws—Chapter 39, Section 23B), which governs the behavior of all state and municipal boards. As in many such regulations, the provisions of the OML prohibit a quorum of board members from meeting and deliberating on matters of public business in private, i.e. outside of duly posted and constituted public board meetings. The Massachusetts Attorney General and the courts have interpreted this law to apply to so-called "serial quorums" or "revolving door" meetings, in which a quorum of members participates in a serial fashion, e.g. one member discussing public business with other board members one at a time, but never actually with a concurrent quorum deliberating. See Open Meeting Law Guidelines, Commonwealth of Massachusetts, Office of the Attorney General, page 26. It is likely that similar interpretations are or will be made with regard to other similar regulations intended to protect the public's right to be informed about matters of public interest.

Problems have arisen due to the fact that regulations such as the OML were written before the widespread adoption of the Internet, and accordingly before the existence of popular communication channels provided over the Internet, including synchronous communication applications such as Internet chat rooms, Web conferences, electronic meetings, etc., and also including asynchronous communication applications such as electronic mail, on-line discussion forums, and others. For example, in Massachusetts, the issue of the applicability of these regulations to on-line communications has recently been raised in the press, and with the Middlesex District Attorney. It has generally been acknowledged that a quorum of board members deliberating board business via private email is impermissible, as well as discussion by a quorum of members within a closed, on-line discussion forum.

Existing systems have fallen significantly short of providing an effective solution to these problems. For example, a prohibition could be applied to an entire class of persons preventing them from participating in all electronic communications. However, this simplistic approach would be overly restrictive, since it prevents many legal and useful communications from occurring. Another possible solution would require automatic logging of all users that participate in a chat room or forum, etc., so that if someone later alleges an violation, it can be more easily investigated. This approach, however, does not prevent the problem from occurring in the first place, or give participants fair warning to avoid an inadvertent prohibited contact.

United States published patent application US20030236751A1, entitled "Method and Apparatus for Managing Conflicts of Interest During the Selection of Legal and Legal-Related Service Providers", describes a method for avoiding conflicts of interest when a client submits a request for proposals ("RFP") to a pool of legal service providers. By having the clients list their opponents, and the service providers list their clients, a host system in US20030236751A1 can prevent an RFP from being viewed by a service provider who might have a potential conflict of interest with the client that posted the RFC. However, the teachings of US20030236751A1 are narrowly directed to this specific purpose, and include no teaching or suggestion of dealing with the concept of a quorum, such that one or more specified persons may participate in the electronic communications channel, but not a full quorum.

In the context of on-line voting systems (e.g. as found at http://www.votenet.com), software is used to verify quorum requirements for voting. Some such systems can verify that a minimum number or percentage of votes from qualified classes of people are cast before a ballot can give valid results. These types of existing systems are designed for use in holding elections, and not for online communications systems such as instant messaging, email, discussion forums, etc. Additionally, existing on-line voting systems also include no techniques for preventing online communications that cause a serial quorum to occur, and are instead concerned with validating participation of voters in an on-line vote.

Some other existing systems have enforced quotas and other mechanisms for limiting concurrent access to a system resource. For example, such an existing system might limit the number users that can be concurrently logged onto an FTP (File Transfer Protocol) site. Another such system for a telephone-based customer service line may allow only a limited number of people to be added to a waiting queue, and cause any callers beyond that limit get a busy signal. These types of systems are intended to bound costs, limit system resource utilization, and to ensure minimum service levels to system users. However, these existing systems are limited to access restrictions on concurrent access by users, and fail to address cases of serial access, e.g. via asynchronous communication channels, such as on-line discussion forums. Also, in the area of synchronous communication mechanisms, these existing systems include no provision for determining a number of users relevant to quorum based not only on the number of concurrent board members or the like that are presently chatting, but also on the number of such special users which have been chatting. Accordingly there is no way to address concerns relating to detection and prevention of serial quorums with regard to synchronous communication channels.

For the above reasons and others, it would be desirable to have a new system for controlling the use of electronic communication systems that allows a specific class of user, such as board members or the like, to conveniently use online communications, but that also effectively prevents inadvertent violations of public meeting and similar regulations.

SUMMARY OF THE INVENTION

To address the above described and other shortfalls of previous approaches, a new method and system are disclosed for preventing on-line violations of open meeting regulations and the like. In the disclosed system, one or more special classes of users are defined for an electronic communication system. For example, the definition of each special class may include quorum requirements, including the number of members of the special class that make up a quorum. Users are then registered to use the communication system. When a user is registered, an indication is stored as to whether that user is a member of a special class. A user may be determined to be a member of a special class in any appropriate manner. For example, a user may be determined to be a member of a special class as a result of the user indicating in a user registration or message composition user interface that they are a member of the special class, as a result of the user being identified as a member of the special class in a list of class members entered through a special class definition user interface, or in some other appropriate way for a given embodiment. In response to a user being identified as a member of a special class, in one embodiment of the disclosed system they are reminded of the restrictions on communications using the communication system arising from that membership.

When a user composes a message for posting or sending through the communication system, a determination is made as to whether they are a member of a special class. For example, the user's identity may be checked against a special class group database to determine whether they are a member of a special class. If the user is not a member of a special class, then their message is passed into the communication system for posting and/or delivery to its indicated recipients. Otherwise, if the user is a member of a special class, then a determination is made as to whether posting or sending the message would trigger any restrictions associated with that class of users. For example, in one embodiment, if a user is a member of a special class prohibiting communications resulting in a serial or other type of quorum, then the disclosed system would calculate the total number of group members participating in the communication to which the message would be added.

For example, in an on-line discussion forum in which replies are posted to topics to form discussion threads, the disclosed system would determine how many members of the class have previously added one or more messages to the discussion thread to which the message currently being composed would be added, and then determine whether the quorum for the class would be reached if the current message were added to that discussion thread.

Alternatively, in an e-mail communication system, participants in a communication to which the message is to be added may be determined based on the class members that are included as intended recipients of the current message. In addition, previous recipients of the message may be counted as participants in the communication, such as when the message is being forwarded between multiple users. Other examples of determining the participants in a communication to which the message is to be added include counting the current participants in a real-time, on-line meeting, such as a chat session, or Web conference. In any case, if the number of group members participating in a communication would reach the quorum number for the special class if the message were added to the communication, then the message is rejected, and prevented from entry into the communication system.

In the event a message is rejected, in one embodiment of the disclosed system, the user is notified of the rejection, and may also be notified of one or more permitted options for the message, such as having the message added to the agenda of a scheduled public meeting associated with the special class of users.

Thus there is disclosed a system that allows for communication technology to be structured so that it allows a specific class of user, such as board member or the like, to conveniently use online communications, and that also effectively prevents inadvertent violations of public meeting and similar regulations.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

Figure 1:
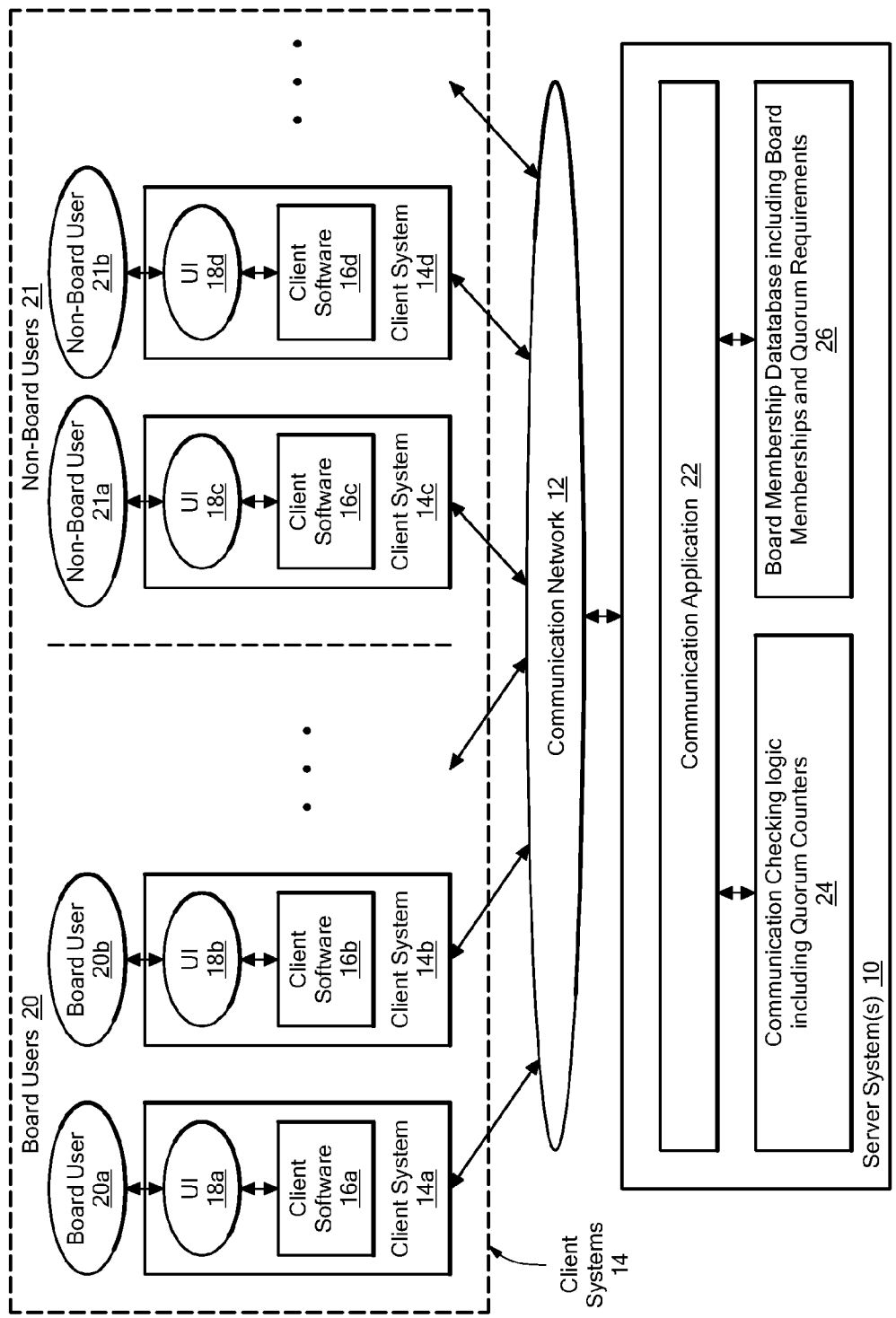
FIG. 1 is a block diagram showing hardware and software components in an illustrative embodiment of the disclosed system.

FIG. 1 is a block diagram showing hardware and software components in an illustrative embodiment of the disclosed system. As shown in FIG. 1, software components in an operational environment including an illustrative embodiment of the disclosed system include server system(s) 10, communication network 12, and client systems 14. The server system(s) 10 is shown including communication application software 22, together with communication checking logic 24 and board membership database 26. The board membership database 26 is an illustrative example of a database in which are stored indications of whether specific users are members of special user classes. A registered user profile database may be used additionally, or as an alternative to the board membership database 26, in order to store indications of special class membership for specific users.

In the illustrative embodiment of FIG. 1, the communication checking logic 24 includes quorum counters that are used to count the number of members in a special class that are participating in a communication to which a message would be added if it were allowed into the communication application 22. For purposes of example, in the illustrative embodiment of FIG. 1, the board membership database includes membership lists of one or more specific boards, and the quorum requirements associated with those boards.

The client systems 14 include client systems associated with users 20 that are members of special user classes (e.g. board member users), shown as client systems 14a, 14b, etc., as well as client systems that are associated with users 21 that are not members of special classes (e.g. non-board member users), shown as client systems 14c, 14d, etc. Each of the client systems 14 includes client software, shown as client software 16a, 16b, 16c, 16d, etc., which generates a user interface through which the communication application 22 can be accessed, and shown for purposes of illustration in FIG. 1 as user interfaces 18a, 18b, and 18c. The user interfaces to the communication application 22 may be embodied as any specific type of user interface. For example, in one embodiment, client system software may be made up of or include a browser application program operable to present Web pages received over the communication network 12, from the communication application 22, e.g. through a multi-window graphical user interface.

The user interface provided to the communication application 22 may be navigated using any specific type of user interface device, such as a computer keyboard or mouse, and/or using voice commands or the like.

The server system(s) 10 may be embodied as any specific number of software processes and/or components executing on one or more computer systems that are communicably connected. Such computer systems may, for example, each consist of at least one processor, program storage, such as memory, for storing program code executable on the processor, one or more input/output devices and/or interfaces, such as data communication and/or peripheral devices and/or interfaces, and may each further include appropriate operating system software. Similarly, the client systems 14 may include any specific type of computer system or other type of client device, such as, for example, desktop computer systems, PDAs (Personal Digital Assistants), cell phones, tablet PCs, or any other appropriate device capable of providing the user interface 18 to a user. The communication network 12 through which are connected the server system(s) 10 and the client systems 14 may include or be made up of a data communication network, such as the Internet, a Local Area Network (LAN), or any other specific type of communication system or network.

While a client-server embodiment is shown in FIG. 1, in which the user interface is provided by a separate client system from the server system, the disclosed system is not limited to such an approach. Accordingly, alternative embodiments may include software corresponding to the server application software 22 as well as software corresponding to the client software (16a, 16b, 16c, 16d, etc.) both with a single computer system.

The communication application software 22 may be embodied as any specific computer program that operates at least in part by providing asynchronous or synchronous electronic communications between multiple users. For example, the communication application 22 may also be embodied, for example, as an asynchronous communication application. Examples of such asynchronous communication applications that may be used include on-line discussion forum applications that enable users to enter text replies to message threads contained under specified topics, electronic mail ("e-mail") applications, and others.

Alternatively, the communication application 22 may be embodied as a synchronous communication application, in which multiple on-line users concurrently participate in a communication session. Examples of such synchronous communication applications include instant messaging (i.e. "chat") applications, electronic meeting applications, Web conferencing applications, Voice over Internet Protocol (VOIP) applications, and others.

Figure 2:
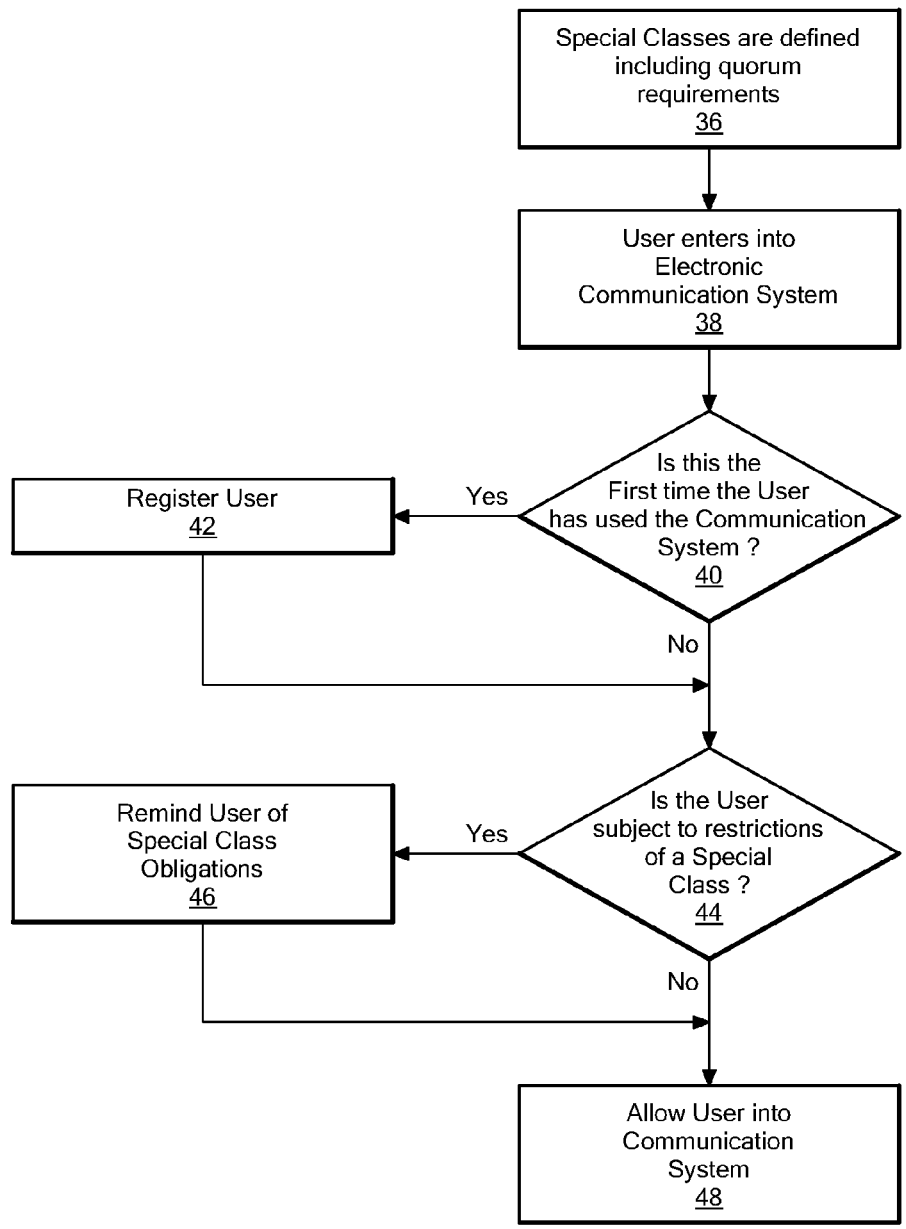
FIG. 2 is a flow chart showing steps performed in an illustrative embodiment of the disclosed system.

FIG. 2 is a flow chart showing steps performed in an illustrative embodiment of the disclosed system. The steps described by the flow chart of FIG. 2 may, for example, be performed by the communication checking logic 24 and/or communication application software 22, operating at least in part through the user interfaces on the client systems 14 of FIG. 1.

As shown in FIG. 2, at step 36 an embodiment of the disclosed system defines one or more special classes of users. The special class definitions made at step 36 include information describing each special class. Such information may, for a given special class, include names and/or identifiers for each of the members of the class, a class name, and quorum requirements for the class. Quorum requirements for a special class group may include a number of group members that constitutes a quorum for the class of users. For example, a special class of users corresponding to a board or the like might have a quorum number of 5. In such a case, the disclosed system would operate to prevent non-public communications involving 5 or more of the members of the special class. The information associated with a special class may further include information regarding one or more public meetings associated with the special class, and potentially an electronically represented and stored agenda for such meetings.

At step 38, a user enters the electronic communication system, such as the electronic communication system provided by the communication application software 22 shown in FIG. 1. Entry into the communication system may involve the user logging in, for example by providing a username and password or other authentication information.

At step 40, an embodiment of the disclosed system determines whether this is the first time that the user has used the communication system. If so, step 40 is followed by step 42, in which the user registers with the communication system. Otherwise, step 40 is followed by step 44.

Registration of the user at step 42 may, for example, include the user providing indication of whether they are a member of any special class, identifying any special classes of which they are a member, providing their user identifiers through which can be identified any special class of which they are members, and/or providing any other relevant information needed for registration and association with one or more special user classes. The user registration performed at step 42 may be performed by the user through one of the user interfaces shown in FIG. 1 (18a, 18b, 18c, 18d, etc.) associated with the user. The information collected during user registration performed at step 42 may be stored in a database accessible the communication system, such as the board membership database 26 of FIG. 1, a general user database, or other database. Step 42 is followed by step 44.

At step 44, the disclosed system determines whether the user is subject to restrictions on communications defined by a special class. The determination at step 44 may, for example, be based at least in part on information provided by the user during registration at step 42. Accordingly, the determination performed at step 44 may involve checking the contents of a database of user information and/or restricted group information that is accessible to the communication system. If the user is subject to restrictions associated with a restricted group, then step 44 is followed by step 46, in which the user is reminded of the obligations and/or restrictions imposed on the user as a result of their membership in the restricted group. Otherwise, step 44 is followed by step 48.

In order to remind the user of restrictions associated with a special class to which they belong, at step 46 the disclosed system may access information regarding such restrictions from a database, such as information in the board membership database 26 of FIG. 1. The disclosed system presents the user with a reminder of these restrictions at step 46 through one of the user interfaces shown in FIG. 1 provided to the user.

For example, the information may be displayed to the user as text displayed in a pop-up window, modal dialog box or other specific type of display object in the user interface. Step 46 is followed by step 48, in which the user is allowed to access the communication system.

Figure 3:
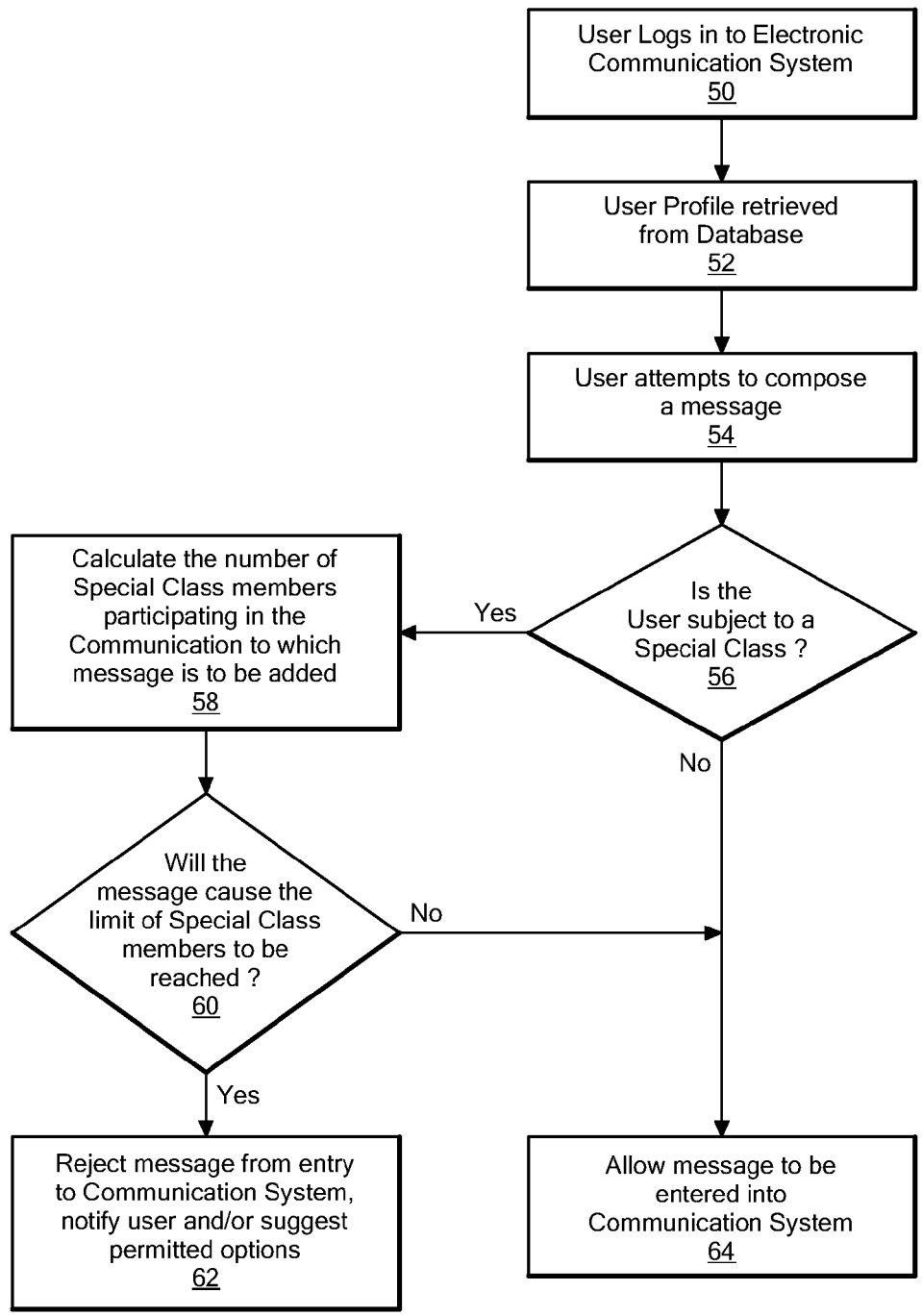
FIG. 3 is another flow chart showing steps performed in an illustrative embodiment of the disclosed system.

FIG. 3 is another flow chart showing steps performed in an illustrative embodiment of the disclosed system. The steps described by the flow chart of FIG. 3 may, for example, be performed by the communication checking logic 24 and/or communication application software 22, through the user interfaces on the client systems 14 of FIG. 1.

As shown in FIG. 3, at step 50 a user logs into an embodiment of the disclosed system. In response to the user logging in at step 50, a user profile is obtained, for example from a database accessible to the communication system. At step 54, the user composes a message to be passed into the communication system. In response to the user attempting to compose a message at step 54, the embodiment of the disclosed system illustrated in FIG. 3 determines at step 56 whether the user is a member of a special user class. The determination at step 56 may be made in response to the contents of the user profile obtained at step 52, and/or to the contents of a special class membership database, such as the board membership database 26 shown in FIG. 1. In an alternative embodiment, the user is allowed to expressly provide an indication, for example by a way of a check box or the like presented within the message composition user interface through which the user composes the message, that the user is a member of a special class of users. If the user is a member of a special class, then step 56 is followed by step 58. Otherwise step 56 is followed by step 64.

In step 58, the embodiment of the disclosed system shown in FIG. 3 calculates the number of members of the restricted group that are participating in the communication to which the message is to be added. For example, in one embodiment the communication system is an on-line discussion forum, such as a Web site through which users may participate in asynchronous text discussions that are organized into topics and nested responses to those topics. In such an embodiment, a topic plus all responses to the topic is considered to be a communication thread. At step 58, the disclosed system would accordingly count the number of special class members that are currently participating in that thread into which the message is to be added. For example, the special class members that have entered at least one message into the thread may be considered to be participating in the thread.

In another embodiment, in the case of a e-mail communication system, at step 58 the disclosed system would count the number of intended recipients of the message that are members of the special class. The disclosed system may further be embodied to count at step 58 all previous recipients of the message that are members of the special class. Accordingly, each time an e-mail message is forwarded to another recipient that is within the special class of users, that recipient is counted towards the total number of special class members participating in the communication.

Alternatively, in an embodiment in which a synchronous communication system is used, at step 58 the disclosed system would count the number of members in the special class that are currently participating in and/or have earlier participated in but previously left or exited a real-time communication session to which the message is to be added, including the user composing the message. Such a communication session could, for example, be a chat session, on-line meeting, Web conference, VOIP conference call, or other specific type of synchronous communication session.

At step 60, the embodiment of FIG. 3 determines whether the total number of members of the special class would reach the limit associated with the special class if the message is conveyed. In other words, the disclosed system determines whether the number of special class members participating in the communication to which the message is to be added will meet or exceed a quorum associated with that special class if the message is added to the communication. For example, if the number of members needed for a quorum in a special class is N, and the number of members of the special class currently participating in a communication to which the message is determined to be N−1 at step 58, and the user sending the message has not yet participated in the communication, then the result of sending the message would be to add 1 more user to the current N−1 special class users participating in the communication, causing the quorum of N users for the special class to be reached. In an embodiment using an on-line discussion forum, if the number of special class users participating in a thread N−1, and the user composing the current message has not yet posted a message to the thread, then at step 60 the disclosed system would determine that the quorum N would be reached if the message were allowed to be conveyed by the communication system. Similarly, if the number of members of a special class participating in a real-time, on-line communication session (e.g. chat session, e-meeting, Web conference, etc.) were N−1, and another member of that special class seeks to also participate in that communication session, e.g. by adding a message to the session or in some other way, then the disclosed system would determine that the quorum N for that special class would be reached if special class member were allowed to send the message or otherwise join the session. Also, if the currently indicated and/or previous recipients of an e-mail message include N−1 members of a special class, and the sender of the e-mail message is also a member of the special class, then the disclosed system would determine that the quorum N for that special class would be reached if the message were allowed to be conveyed by the communication system to a recipient who is also a member of the special class.

If, at step 60 a determination is made that the limit for that special class would be reached if the message from the special class member were conveyed by the communication system, then step 60 is followed by step 62. Otherwise, if a determination is made at step 60 that the limit on members of the special class participating in a communication would not be reached if the message were conveyed by the communication system, then step 60 is followed by step 64, at which the message composed at step 64 is allowed into the communication system for posting to a communication thread, sending to its intended recipients, and the like.

At step 62, in the event that the quorum for the special class would be reached by allowing the message being composed at step 54 to be conveyed, then the message is rejected. A notification message is passed to the user, informing the user that the message has been rejected because it is in violation of the limits on the special class of users to which the user belongs. The notification may be provided in a pop-up window, modal dialog box or the like, provided through the user interface (18a, 18b) of FIG. 1. The notification provided at step 62 may also include one or more options that can be selected by the user. In one embodiment, the notification provided at step 62 enables the user to add the rejected message to an electronic copy of an agenda for a public meeting that is scheduled for the special user class.

Figure 4:
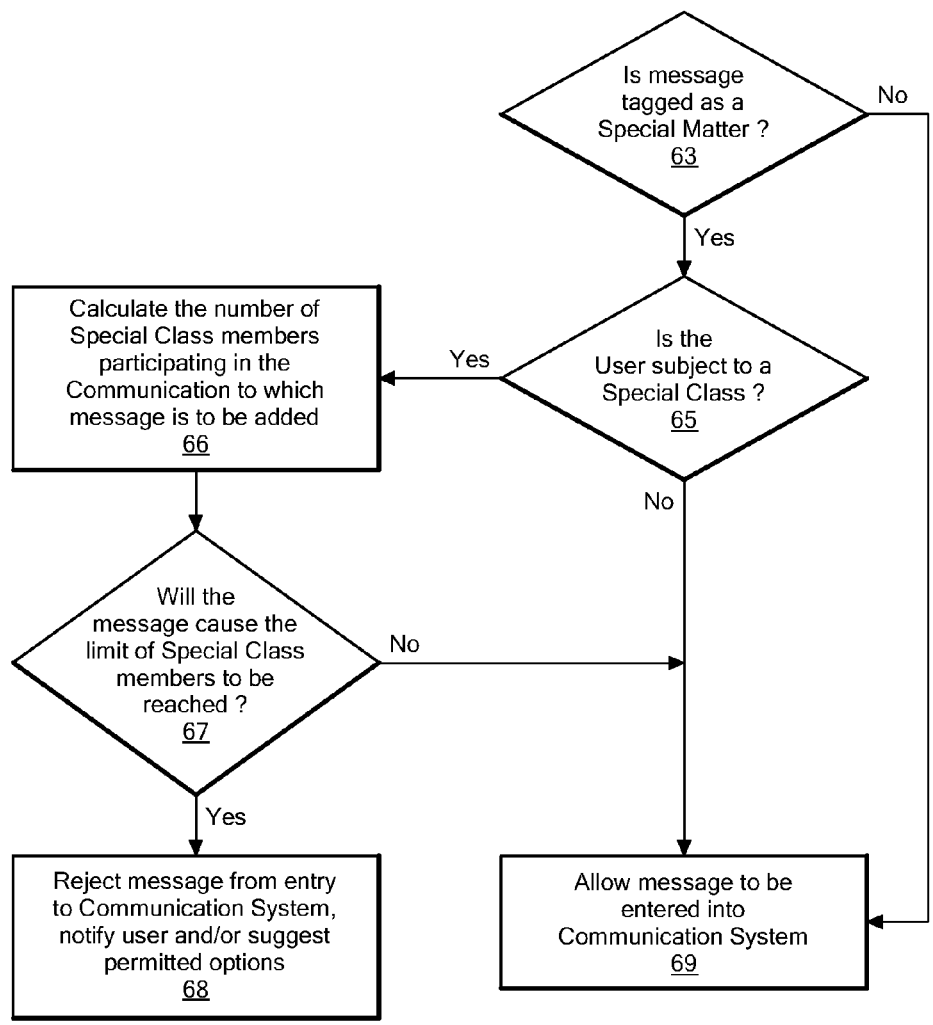
FIG. 4 is a flow chart showing steps performed in an alternative illustrative embodiment of the disclosed system.

FIG. 4 is a flow chart showing steps performed in an alternative illustrative embodiment of the disclosed system. As shown in FIG. 4, at step 63 a message in the disclosed system may be tagged as a special matter that is subject to special class restrictions. For example, a message or topic may be tagged as a special matter in the event that it contains or refers to public or board business within the purview of a special class (e.g. "any public business or policy within its jurisdiction"). Messages not containing or referring to any such special subject matter, such as messages that are part of purely social communications or on-line conversations, would not be tagged at step 63.

The tagging performed at step 63 may be accomplished in a variety of ways. In a first embodiment of the disclosed system, a message composition user interface enables a user that is a member of a special class to expressly tag a message as containing or referring to public or board business. Such express tagging of a message may, for example, be accomplished by a message author checking a check box display object or through some other type of user indication through one or more display objects in the message composition user interface. Alternatively, a message may be tagged as a special matter in step 63 by another user or group of users, potentially other than the message author, that subsequently read the message after it has been posted, for example through a message reading interface provided by an on-line discussion forum or the like. Such tagging may similarly be accomplished by a non-author user, who may or may not be a member of the relevant special class, through check box or other suitable display objects within a user interface such as the user interfaces 18c and 18d shown in FIG. 1. In one embodiment, a voting scheme in which the number of users that indicate a given message or topic should be considered a special matter is counted and compared to a threshold. If the number of users indicating that the message should be considered a special matter reaches or exceeds the threshold number, then the message is tagged as a special matter at step 63. In another embodiment, the disclosed system performs an automatic text analysis on the contents of the message to determine whether it should be tagged as a special matter at step 63.

In the illustrative embodiment of FIG. 4, steps 65, 66, 67, and 68 are only performed in the event that a message is tagged as a special matter. Otherwise, if a message is not tagged as a special matter, it is allowed to be entered into the communication system at step 69.

The remaining steps of FIG. 4 correspond to steps described above with respect to FIG. 3, and are performed analogously. Step 65 corresponds to step 56 of FIG. 3, step 66 corresponds to step 58 of FIG. 3, step 67 corresponds to step 60 of FIG. 3, step 68 corresponds to step 62 of FIG. 3, and step 69 corresponds to step 64 of FIG. 3.

Figure 5:
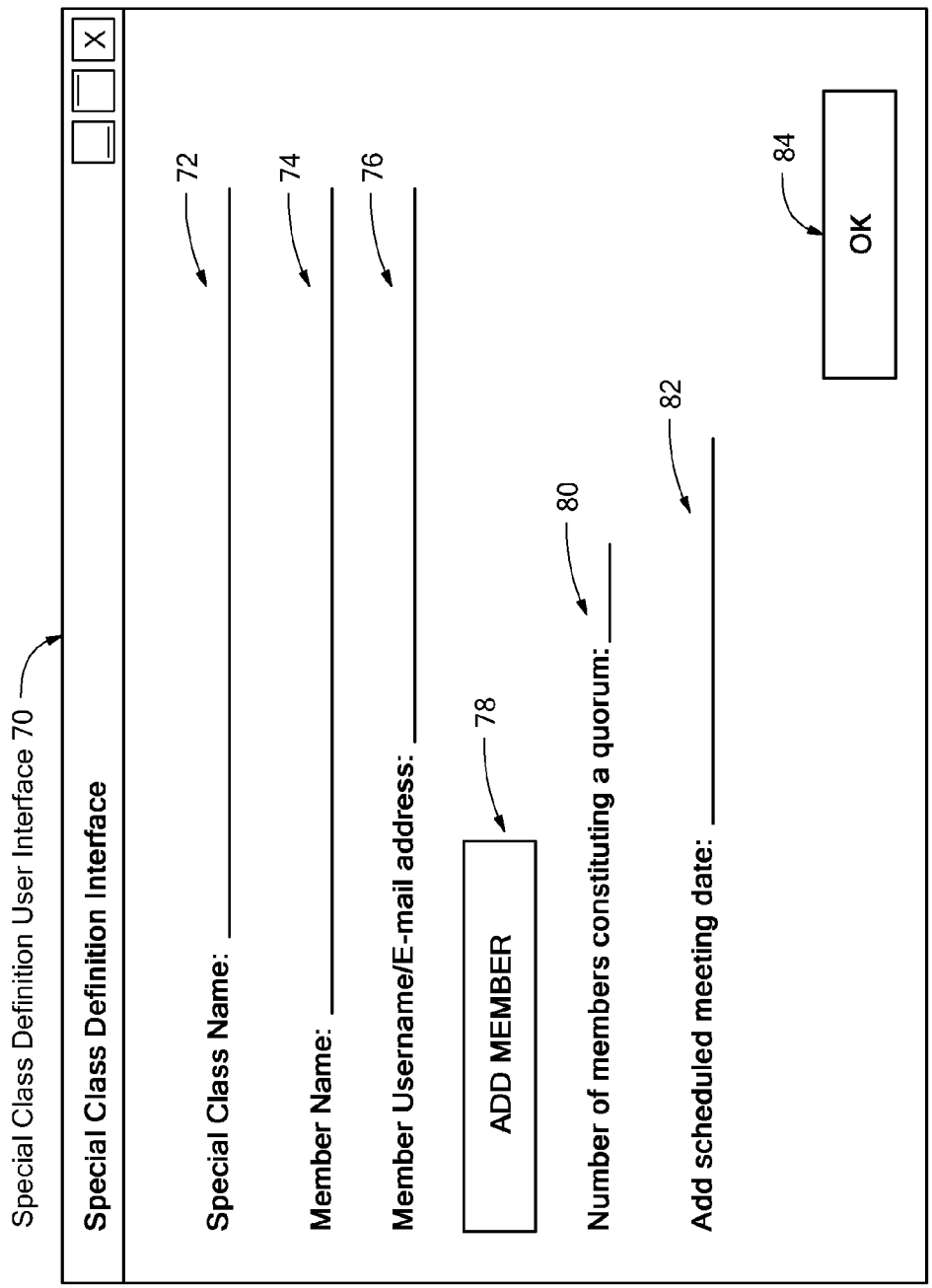
FIG. 5 is a simplified screen shot showing a special class definition user interface for an illustrative embodiment of the disclosed system.

FIG. 5 is a simplified screen shot showing a restricted group definition user interface for an illustrative embodiment of the disclosed system. The restricted group definition user interface 70 of FIG. 5 may, for example, be provided by the communication application 22 as part of the user interfaces (18a, 18b, 18c, 18d, etc.) of FIG. 1, for example as part of a user interface provided to a member of a restricted group, to an appropriate administrative user such as a town clerk of the like, or to a regular user. The information obtained through the restricted group definition user interface 70 of FIG. 5 may, for example, be stored in restricted group definition database, such as the board membership database 26 of FIG. 1. In one embodiment, the restricted group definition user interface 70 may be presented during step 36 of FIG. 2.

As shown in FIG. 5, an example of a special class definition user interface 70 includes a group name field 72 into which a user can enter the name of the special class being defined. Members of the special class can be added to a member list for the special class by entering a member name into the field 74, and then entering the username or e-mail address of the member into the field 76. Clicking on the ADD MEMBER button 78 then causes a member with name and username or e-mail address to be added to the member list for the special class.

A field 80 enables a user to enter a number of members that constitute a quorum for the special class, and a meeting date field 82 enables the user to enter a date for a next scheduled meeting to be associated with the special class. When the user clicks on the OK button 84, information entered for the special class is added to a database storing special class definition information.

Figure 6:
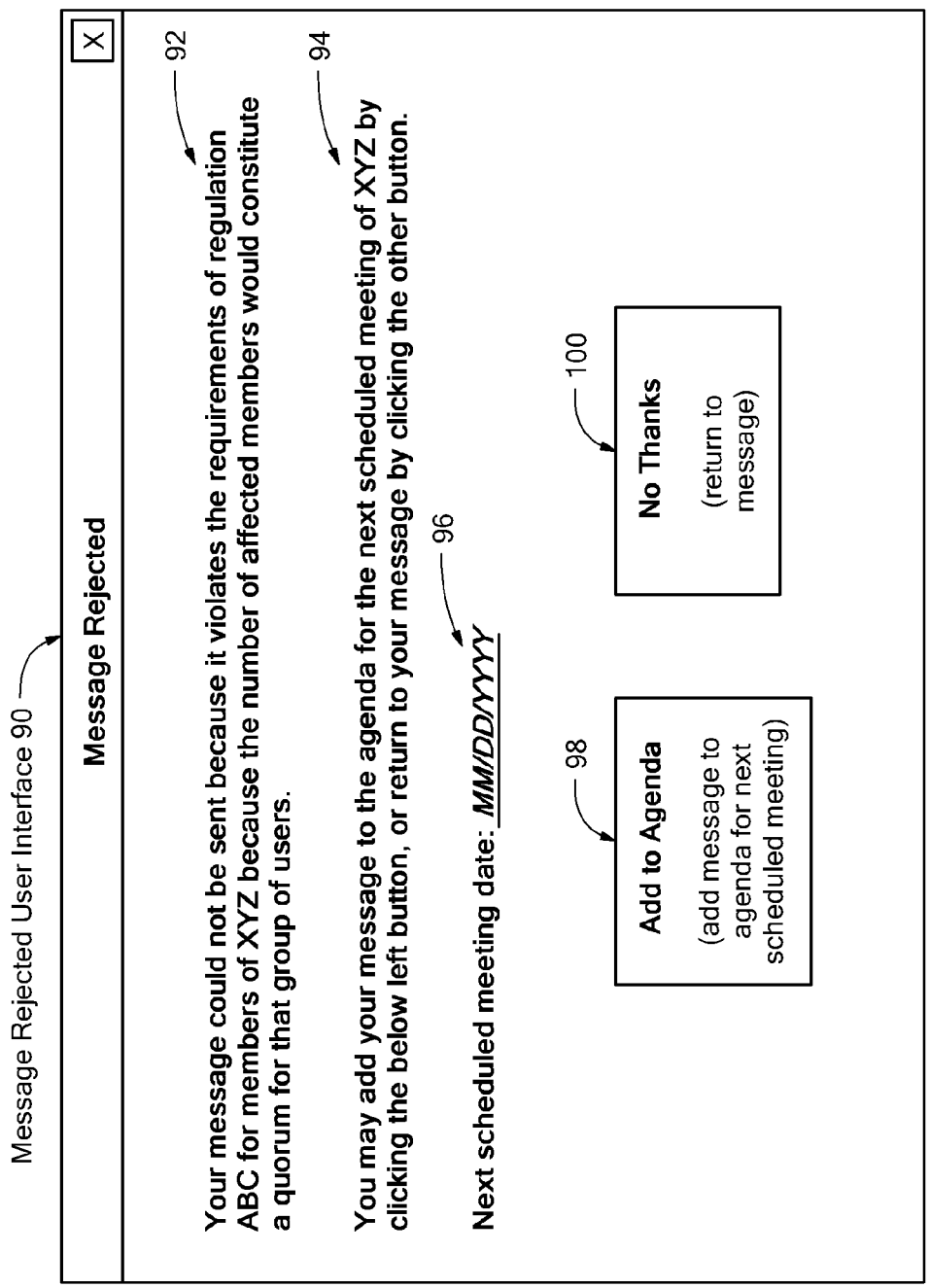
FIG. 6 is a simplified screen shot showing a message rejection user interface for an illustrative embodiment of the disclosed system.

FIG. 6 is a simplified screen shot showing a message rejection user interface for an illustrative embodiment of the disclosed system. The message rejected user interface 90 of FIG. 6 may, for example, be provided by the communication application 22 as part of the user interfaces (18a, 18b, etc.) of FIG. 1, and provided to a member of a restricted group in the event a message has been rejected due to the restrictions associated with a special class. The information provided through the message rejected user interface 90 of FIG. 6 may include information stored in a special class definition database, such as the board membership database 26 of FIG. 1. The message rejected user interface 90 may, for example, be provided by an embodiment of the disclosed system at step 62 of FIG. 3 or step 68 of FIG. 4.

As shown in FIG. 6, the message rejected user interface 90 includes an indication 92 that the message that the user was attempting to transmit or otherwise enter into the communication system was rejected due to restrictions associated with a special class that the user belongs to. An indication 94 is also included advising that the user can select an optional step with regard to the rejected message. In the example of FIG. 6, the user is allowed to add the rejected message to the electronically stored agenda for the next scheduled meeting of the special class on a date 96. The example of FIG. 6 provides a first graphical button object 98 that causes the rejected message to be added to the agenda if the user clicks on it, and a second graphical button object 100 that does not cause the rejected message to be added to the agenda, but simply returns the user to the message that they were attempting to enter into the communication system. At that point the user may decide to delete the message, change the list of recipients, or take some other action.

Figure 7:
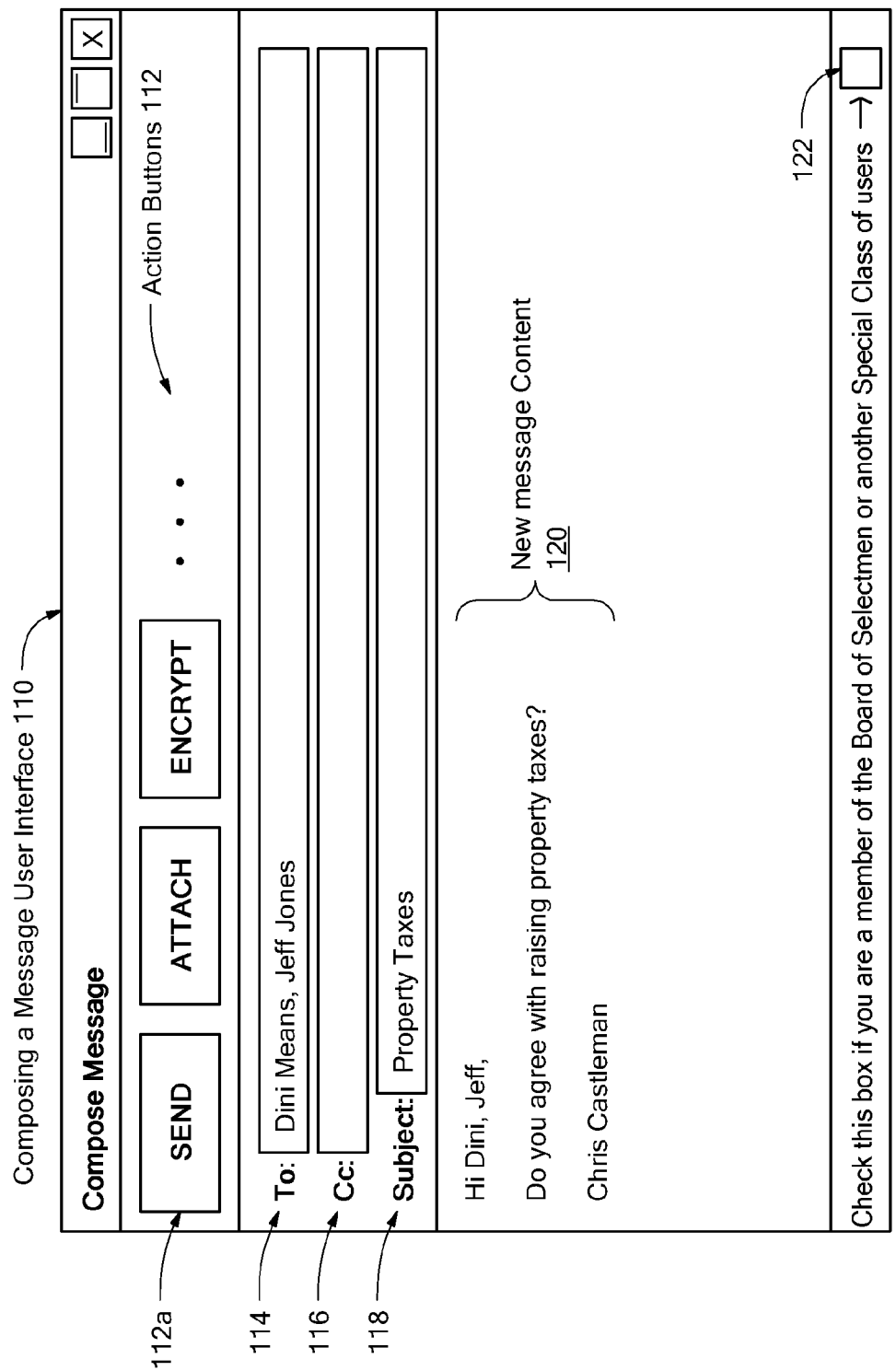
FIG. 7 is a simplified screen shot showing a message composition user interface for an illustrative embodiment of the disclosed system.

FIG. 7 is a simplified screen shot showing a message composition user interface 110 for an illustrative embodiment of the disclosed system. As shown in FIG. 7, the user interface 110 includes a number of action buttons 112, shown for purposes of illustration including a send button 112a, an attach button 112b, an encrypt button 112c, etc. A TO: field 114 and a Cc: field 116 allow a message author to indicate the recipients of the message being composed, which is shown including the new message content 120. A Subject: field allows the message author to indicate a message subject. A check box 122 enables the message author to indicate that they are a member of a special class, e.g. a member of the Board of Selectmen or another special class. The check box 122 is an example of how a message can be tagged as a special matter consistent with step 63 in the illustrative embodiment of the disclosed system shown in FIG. 4.

Those skilled in the art will recognize that while the message composition user interface 110 is for an electronic mail communication application or the like, the present system is not so limited, and alternative message composition user interfaces may be used as appropriate for on-line discussion forums, instant messaging, and/or any other appropriate type of communication system for a given embodiment. More-over, while a check box 122 is shown for purposes of illustration as an example of a display object enabling a message author to indicate that they are a member of a special class, any other specific type of display object that enables the user to make such indication may be used in the alternative.

The disclosed system may be embodied to address enforcement of public meeting laws, such as the Open Meeting Law ("OML") of Massachusetts (Massachusetts General Laws—Chapter 39, Section 23B). In such an embodiment, when a user signs up to use a communication system, such as an on-line discussion forum or the like, they specify whether they are a member of a special class of persons subject to the OML, e.g., a Selectman. Such special class users would be prohibited from participating in on-line discussions with others of that same special group, e.g., other members of the Board of Selectmen, if doing so would create a quorum of that group discussing the same issue. In one embodiment, the disclosed system would disable the user's ability to compose a response to a topic in an on-line discussion forum in the event that entering that response would cause a quorum of special class members to be created within that topic.

For example, consider a use case in which a town has a Board of Selectmen with 5 members: Dini, Jeff, Chris, Jim and Val. Further assume for purposes of example that the number of Selectmen resulting in a quorum is 3. In such a case, any three of Dini, Jeff, Chris, Jim or Val would constitute a quorum. The town may then provide an on-line discussion forum using an embodiment of the disclosed system. A citizen named Rob may then post a comment in the on-line discussion forum regarding the town's budget. Selectman Jim then enters a response to Rob's post, and later in the same discussion thread Selectman Chris also enters a response to Rob's post. At that point, if Selectman Jeff tries to enter a response to the topic, he would be prevented from doing so by the disclosed system, since a third Selectman commenting on the same issue could be interpreted as allowing a quorum of Selectmen to deliberate outside of a properly constituted public meeting, in violation of the OML.

As described above, the disclosed system can be embodied to identify members of any specific special class of users having access to a communication system. Special classes may be defined to cover any category of persons to whom an open meeting regulation might apply, such as a Board of Selectman member, a School Committee member, a Planning Board member, etc. This membership identification information for each special class may be maintained either within a database accessible to server application code for the communication system, and/or within in a client-side software "cookie" or the like stored on the client system. The forum software would also allow the administrator of the server to record the statutory number of persons on each board which constitute a quorum of that board, e.g., three if majority constitutes a quorum on a seven-person board.

Those skilled in the art will recognize that while the above description includes reference to operation of various embodiments with regard to controlling the entry of messages into a communication system, the disclosed system may further be embodied to control access to content based on the number of members of a special class of users that have accessed the content. In such an embodiment, the disclosed system would count the number of members of a special class that have accessed a content item, such as a file, document, etc. When the number of special class members having accessed the content item reaches one less than a quorum associated with the special class, subsequent attempts by other special class members to access the content item would be denied.

Those skilled in the art will further recognize that the disclosed system can be embodied to control communications involving any specific type of message contents, such as text, images, audio, video, etc. For example, an embodiment of the disclosed system could be provided that prevented a quorum of special class members from participating in a video conference, accessing the same video content, etc.

The present invention can be realized in hardware, software, or a combination of hardware and software. A system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for preventing violations of legal regulations on users of an electronic communication system, comprising:

determining whether a user composing a message to be conveyed using said electronic communication system is a member of a special class of users whose communications are subject to said legal regulations;

responsive to determining that said user is a member of said special class, determining a number of special class members that would be participating in a communication to which said message would be added if said message were conveyed using said electronic communication system;

determining whether said number of special class members that would be participating in said communication if said message were conveyed using said electronic communication system would be as large as a limit associated with said special class;

responsive to determining that said number of special class members that would be participating in said communication if said message were conveyed using said communication system would be at least as large as said limit associated with said special class, preventing said message from being conveyed by said electronic communication system; and in the event that said message is prevented from being conveyed using said electronic communication system, presenting a notification indicating to said user that said message is prevented from being conveyed because of said determination that said user is a member of said special class, wherein said notification provides an option for redirecting said message comprising a tool for adding said message to an agenda of a future meeting associated with said special class.

2. The method of claim 1, wherein said limit associated with said special class is a quorum associated with said special class.

3. The method of claim 2, further comprising:
defining said special class, wherein said defining includes entering said quorum associated with said special class.

4. The method of claim 3, wherein said defining said special class further comprises defining said user as a member of said special class.

5. The method of claim 1, wherein said electronic communication system comprises one of a set consisting of a synchronous electronic communication system and an asynchronous electronic communication system.

6. The method of claim 1, further comprising:
in response to said determination that said user is a member of said special class, presenting a notification to said user reminding said user of restrictions associated with said special class with regard to communications using said electronic communication system.

7. The method of claim 1, further comprising:
in the event that said number of members of said special class that would be participating in said communication if said message were conveyed using said electronic communication system would be less than said limit associated with said special class, allowing said message to be conveyed using said electronic communication system.

8. The method of claim 1, wherein said determining whether said user is a member of said special class further comprises checking an identity of said user against a special class definition database.

9. The method of claim 1, wherein said determining whether said user is a member of said special class further comprises checking an identity of said user against a user profile database.

10. The method of claim 1, wherein said determining whether said user is a member of said special class further comprises providing a user interface object within a message composition user interface enabling said user to provide an indication that said user is a member of said special class.

11. The method of claim 1, wherein said determining whether said number of special class members that would be participating in said communication if said message were conveyed using said electronic communication system would be as large as a limit associated with said special class comprises counting special class members that have entered posts into a discussion thread into which said message would be added to in an on-line discussion forum when conveyed by said communication system.

12. The method of claim 1, wherein said determining whether said number of special class members that would be participating in said communication if said message were conveyed using said electronic communication system would be as large as a limit associated with said special class comprises counting members of said special class that are intended recipients of the message, wherein said message is an e-mail message.

13. The method of claim 1, wherein said determining whether said number of special class members that would be participating in said communication if said message were conveyed using said electronic communication system would be as large as a limit associated with said special class comprises counting members of the special class that are currently participating in a real-time communication session to which said message would be added when conveyed by said electronic communication system.

14. The method of claim 1, further comprising:
determining whether said message regards subject matter within a purview of said special class; and
performing said step of preventing said message from being conveyed by said electronic communication system only in the event that said message regards said subject matter within said purview of said special class.

15. A system including a computer readable memory, said computer readable memory having stored thereon program code for preventing violations of legal regulations on users of an electronic communication system, said program code comprising:

program code for determining whether a user composing a message to be conveyed using said electronic communication system is a member of a special class of users whose communications are subject to said legal regulations;

program code for, responsive to determining that said user is a member of said special class, determining a number of special class members that would be participating in a communication to which said message would be added in the event that said message were conveyed using said electronic communication system;

program code for determining whether said number of special class members that would be participating in said communication if said message were added to said communication would be as large as a limit associated with said special class;

program code for, responsive to determining that said number of special class members that would be participating in said communication if said message were added to said communication would be at least as large as said limit associated with said special class, preventing said message from being conveyed by said electronic communication system; and program code for, in the event that said message is prevented from being conveyed using said electronic communication system, presenting a notification indicating to said user that said message is prevented from being conveyed because of said determination that said user is a member of said special class, wherein said notification provides an option for redirecting said message comprising a tool for adding said message to an agenda of a future meeting associated with said special class.

16. A computer program product including a non-transitory computer readable storage medium, said computer readable storage medium having stored thereon program code for preventing violations of legal regulations on users of an electronic communication system, said program code comprising:
  program code for determining whether a user composing a message to be conveyed using said electronic communication system is a member of a special class of users whose communications are subject to said legal regulations;
  program code for, responsive to determining that said user is a member of said special class, determining a number of special class members that would be participating in a communication to which said message would be added in the event that said message were conveyed using said electronic communication system;
  program code for determining whether said number of special class members that would be participating in said communication if said message were added to said communication would be as large as a limit associated with said special class;
  program code for, responsive to determining that said number of special class members that would be participating in said communication if said message were added to said communication would be at least as large as said limit associated with said special class, preventing said message from being conveyed by said electronic communication system; and
  program code for, in the event that said message is prevented from being conveyed using said electronic communication system, presenting a notification indicating to said user that said message is prevented from being conveyed because of said determination that said user is a member of said special class, wherein said notification provides an option for redirecting said message comprising a tool for adding said message to an agenda of a future meeting associated with said special class.

17. A method for preventing violations of legal regulations on users of an electronic communication system, comprising:
  determining whether a user composing a message to be conveyed using said electronic communication system is a member of a special class of users whose communications are subject to said legal regulations;
  responsive to determining that said user is a member of said special class, determining a number of special class members that would be participating in a communication to which said message would be added if said message were conveyed using said electronic communication system;
  determining whether said number of special class members that would be participating in said communication if said message were conveyed using said communication system would be as large as a limit associated with said special class;
  responsive to determining that said number of special class members that would be participating in said communication if said message were conveyed using said communication system would be at least as large as said limit associated with said special class, preventing said message from being conveyed by said electronic communication system; and
  wherein said determining whether said number of special class members that would be participating in said communication if said message were conveyed using said electronic communication system would be as large as a limit associated with said special class comprises counting members of said special class that are intended recipients of the message, wherein said message is an e-mail message.

18. A system including a computer readable memory, said computer readable memory having stored thereon program code for preventing violations of legal regulations on users of an electronic communication system, said program code comprising:
  program code for determining whether a user composing a message to be conveyed using said electronic communication system is a member of a special class of users whose communications are subject to said legal regulations;
  program code for, responsive to determining that said user is a member of said special class, determining a number of special class members that would be participating in a communication to which said message would be added in the event that said message were conveyed using said electronic communication system;
  program code for determining whether said number of special class members that would be participating in said communication if said message were added to said communication would be as large as a limit associated with said special class;
  program code for, responsive to determining that said number of special class members that would be participating in said communication if said message were added to said communication would be at least as large as said limit associated with said special class, preventing said message from being conveyed by said electronic communication system; and
  wherein said determining whether said number of special class members that would be participating in said communication if said message were conveyed using said electronic communication system would be as large as a limit associated with said special class comprises counting members of said special class that are intended recipients of the message, wherein said message is an e-mail message.

19. A computer program product including a non-transitory computer readable storage medium, said computer readable storage medium having stored thereon program code for preventing violations of legal regulations on users of an electronic communication system, said program code comprising:
  program code for determining whether a user composing a message to be conveyed using said electronic communication system is a member of a special class of users whose communications are subject to said legal regulations;
  program code for, responsive to determining that said user is a member of said special class, determining a number of special class members that would be participating in a communication to which said message would be added in the event that said message were conveyed using said electronic communication system;
  program code for determining whether said number of special class members that would be participating in said communication if said message were added to said communication would be as large as a limit associated with said special class;

program code for, responsive to determining that said number of special class members that would be participating in said communication if said message were added to said communication would be at least as large as said limit associated with said special class, preventing said message from being conveyed by said electronic communication system; and wherein said determining whether said number of special class members that would be participating in said communication if said message were conveyed using said electronic communication system would be as large as a limit associated with said special class comprises counting members of said special class that are intended recipients of the message, wherein said message is an e-mail message.

* * * * *